United States Patent
Chaudhuri et al.

(10) Patent No.: US 9,445,320 B2
(45) Date of Patent: Sep. 13, 2016

(54) METHOD AND SYSTEM FOR AUTOMATICALLY CREATING A NEIGHBOR LIST

(71) Applicant: Wipro Limited, Bangalore (IN)

(72) Inventors: Saptarshi Chaudhuri, Bangalore (IN); Irfan Baig, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 14/669,085

(22) Filed: Mar. 26, 2015

(65) Prior Publication Data

US 2016/0234734 A1 Aug. 11, 2016

(30) Foreign Application Priority Data

Feb. 11, 2015 (IN) .............................. 673/CHE/2015

(51) Int. Cl.
| | |
|---|---|
| *H04W 36/00* | (2009.01) |
| *H04W 36/30* | (2009.01) |
| *H04W 36/16* | (2009.01) |
| *H04W 88/08* | (2009.01) |

(52) U.S. Cl.
CPC ..... *H04W 36/0061* (2013.01); *H04W 36/0088* (2013.01); *H04W 36/165* (2013.01); *H04W 36/30* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 2009/0047961 A1* | 2/2009 | Kim | H04W 36/0083 455/436 |
| 2013/0130695 A1* | 5/2013 | Ryu | H04W 36/0083 455/438 |
| 2014/0038597 A1* | 2/2014 | Wang | H04W 36/0083 455/434 |

* cited by examiner

*Primary Examiner* — Erika Washington
(74) *Attorney, Agent, or Firm* — LeClairRyan, a Professional Corporation (57) ABSTRACT

A method and system for automatically updating a neighbor list associated with a serving base station is disclosed. The method involves receiving a measurement report from a User Equipment (UE) associated with the serving base station, wherein the measurement report comprises at least one relative signal strength measurement between the UE and each of a plurality of neighboring base stations; comparing the at least one relative signal strength measurement between the UE and the plurality of neighboring base stations with a current signal strength between the UE and the serving base station; identifying at least one of the plurality of neighboring base stations having a greater relative signal strength with respect to the UE than the serving base station a predefined number of times based on the comparison; and updating the neighbor list associated with the serving base station with the identified at least one neighboring base stations.

18 Claims, 4 Drawing Sheets

FIG. 4: Example Computer System

METHOD AND SYSTEM FOR AUTOMATICALLY CREATING A NEIGHBOR LIST

This application claims the benefit of Indian Patent Application Serial No. 673/CHE/2015 filed Feb. 11, 2015, which is hereby incorporated by reference in its entirety.

FIELD

This disclosure relates generally to managing neighbor lists in a wireless communication environment, and more particularly to a method and system for automatically creating a neighbor list.

BACKGROUND

Long Term Evolution (LTE) or 4G network is a wireless communication network designed to provide subscribers with a high speed internet experience on their mobile devices without any traffic restrictions either in the mobile device or in the network. One of the requirements of LTE is to provide unbroken connections between base stations, also called Evolved Node Bs or eNodeBs or eNBs, and User Equipment (UEs) moving at high speeds. This feature of providing unbroken connections may be accomplished by a serving base station by performing a handover or handoff to another base station. The serving base station or serving eNB decides when to initiate the handover and to which eNB the UE needs to be handed over. These handovers may be based on the UE signal strength measurements of the Neighbour eNBs.

The serving eNB knows its neighbours through a Neighbour Relation Table (NRT) or a neighbour list. An eNB uses the NRT to determine which neighbour to handover a UE to. Typically, an eNB neighbour is added and maintained manually by the network operator. The neighbour list generation and maintenance may turn out to be a significant overhead in the existing mobile networks especially when the networks are expanded and new eNBs are added. For LTE, the task of manually maintaining a neighbour list is further challenging for operators because in addition to defining intra LTE neighbour relations, the operator also has to provision 2G and 3G neighbours. To overcome this overhead, the 3GPP standard covering LTE specifies an Automatic Neighbour Relation (ANR) function wherein UEs connected to a serving eNB may provide information regarding neighbouring eNBs to the serving eNB. The serving eNB may then update its NRT based on this information. However, in this case, the number of neighbours reported by the UEs may be substantially high and processing the high number of neighbours to decide the target neighbour for handover may be time consuming and computationally intensive.

SUMMARY

In one embodiment, a method of creating a neighbor list associated with a serving base station is disclosed. The method comprises determining at least one of a handover failure ratio, a ping pong factor, and a call drop ratio for each of a plurality of neighboring base stations associated with the serving base station; computing a Neighbor Relation Measure (NRM) for each of the plurality of neighboring base stations as a weighted sum of the at least one of the handover failure ratio, the ping pong factor, and call drop ratio associated with each of the plurality of neighboring base stations; and creating a neighbor list by including one or more neighboring base stations from the plurality of neighboring base stations having NRM lower than a predefined threshold NRM and having a priority sequence value less than a threshold priority sequence value.

In another embodiment, an apparatus for creating a neighbor list is disclosed. The apparatus may be associated with a serving base station and may comprise a processor and a memory communicatively coupled to the processor, wherein the memory stores processor-executable instructions, which, on execution, causes the processor to: determine at least one of a handover failure ratio, a ping pong factor, and a call drop ratio for each of a plurality of neighboring base stations associated with the serving base station; compute a Neighbor Relation Measure (NRM) for each of the plurality of neighboring base stations as a weighted sum of the at least one of the handover failure ratio, the ping pong factor, and call drop ratio associated with each of the plurality of neighboring base stations; and create a neighbor list by including one or more neighboring base stations from the plurality of neighboring base stations having NRM lower than a predefined threshold NRM and having a priority sequence value less than a threshold priority sequence value.

In another embodiment, a non-transitory computer-readable storage medium storing instructions which when executed by a processor enable the processor to automatically create a neighbor list is disclosed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
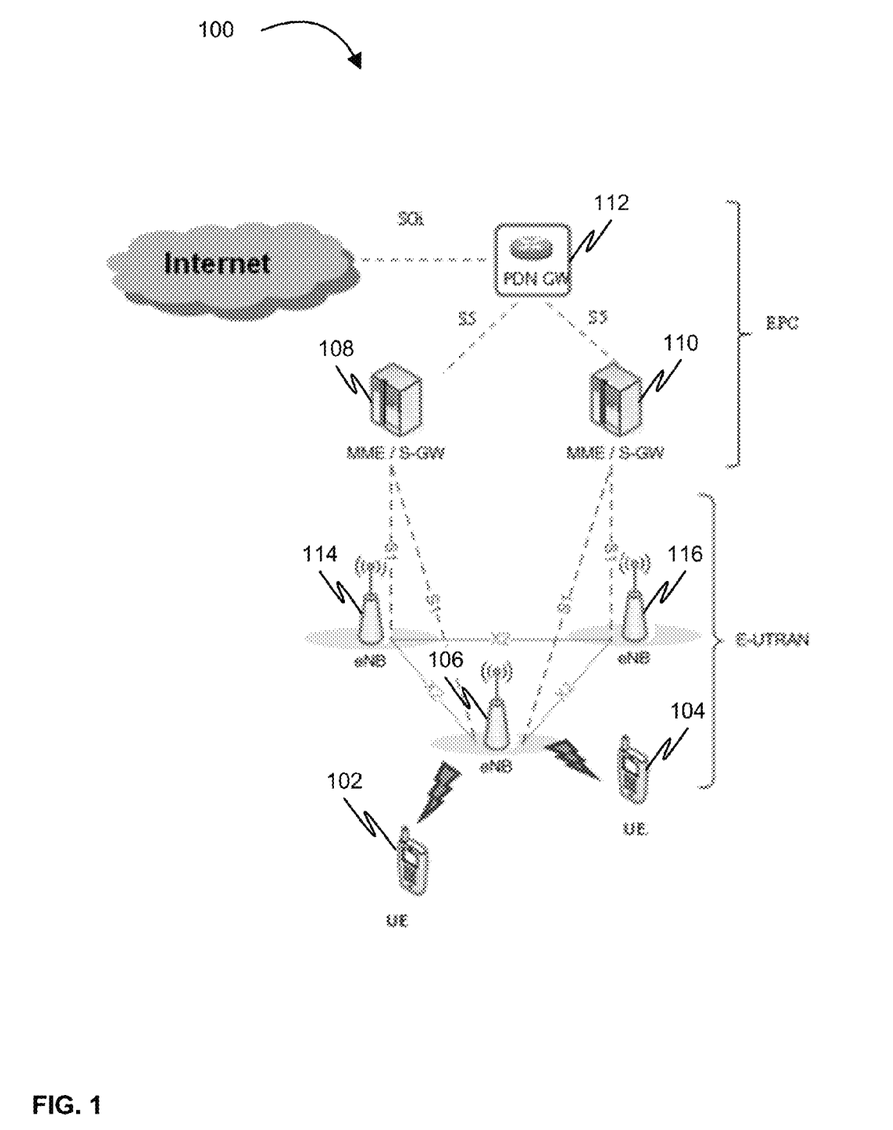
FIG. 1 illustrates an exemplary broadband wireless network architecture in which various embodiments of the present disclosure may function.

An exemplary high level network 100 depicting a broadband wireless network architecture is illustrated in FIG. 1. For purposes of illustration, the network 100 corresponds to an LTE network. However, the depicted LTE network is merely an exemplary network, and thus it will be understood that the teachings of the disclosure contemplate other broadband wireless networks such as WiMax, High Speed Packet Access (3GPP's HSPA), etc.

In FIG. 1, one or more user equipment (UE) such as UE 102 and UE 104 may communicate wirelessly with an eNB 106 that is an LTE base station. In this case, eNB 106 acts as the serving eNB for both UE 102 and UE 104. The functionalities of eNB 106 may include Radio Resource Management (RRM), header compression and encryption of user data stream, packet scheduling and transmission, physical layer processing, etc. An example of a UE may be a cell phone, PDA, tablet computer, etc. The eNB 106 may communicate with an evolved packet core (EPC) that may include a Mobility Management Entity (MME) associated with a serving gateway (S-GW). The MME and the S-GW are represented together in FIG. 1 as MME/S-GW 108 and MME/S-GW 110 for the sake of simplicity. However, it is to be noted that the MME and the S-GW in some embodiments may be separate and distinct entities. The MME manages and stores UE context and further generates temporary identities and allocates them to UEs. The SGW routes and forwards user data packets, while also acting as the mobility anchor for the user plane during inter-eNB handovers and as the anchor for mobility between LTE and other 3GPP technologies. Network 100 may further include a Packet Data Network Gateway (PDN GW) 112 that provides connectivity to UE 102 and UE 104 to external packet data networks by being the point of exit and entry of traffic for UE 102 and UE 104. A UE may have simultaneous connectivity with more than one PDN GW for accessing multiple PDNs. The PDN GW performs policy enforcement, packet filtering for each user, charging support, lawful Interception, etc.

In addition to the serving eNB 106, network 100 may further include neighboring eNBs such as an eNB 114 and an eNB 116. It is to be noted that, while only eNB 114 and eNB 116 are illustrated as neighbors in FIG. 1 for sake of simplicity, serving eNB 106 may have any number of neighbors. The serving eNB 106 may maintain a neighbor relation table (NRT) that provides information corresponding to neighboring eNBs. The NRT may be used by serving eNB 106 to determine which neighbor to handover a UE to. The NRT maintained by the serving eNB 106 may or may not include eNB 114 and eNB 116. For example, the NRT maintained by eNB 106 may include eNB 114 but not eNB 116. However, eNB 106 may discover neighbor eNB 116 using an Automatic Neighbor Relation (ANR) function. Here, the serving eNB 106 may receive measurement reports from all UEs current served by the eNB 106, that is, from UE 102 and UE 104. The measurement reports may include various signal strength measurements between the UE and a number of eNBs in the vicinity of the UE. In this case, UE 104 may detect a signal from eNB 116 and accordingly provide this information to serving eNB 106. The serving eNB 106 may check its own NRT to verify if eNB 116 has been added as a neighbor. On determining that eNB 116 is not on the NRT, serving eNB 106 may update the NRT to include the discovered neighbor eNB 116.

Figure 2:
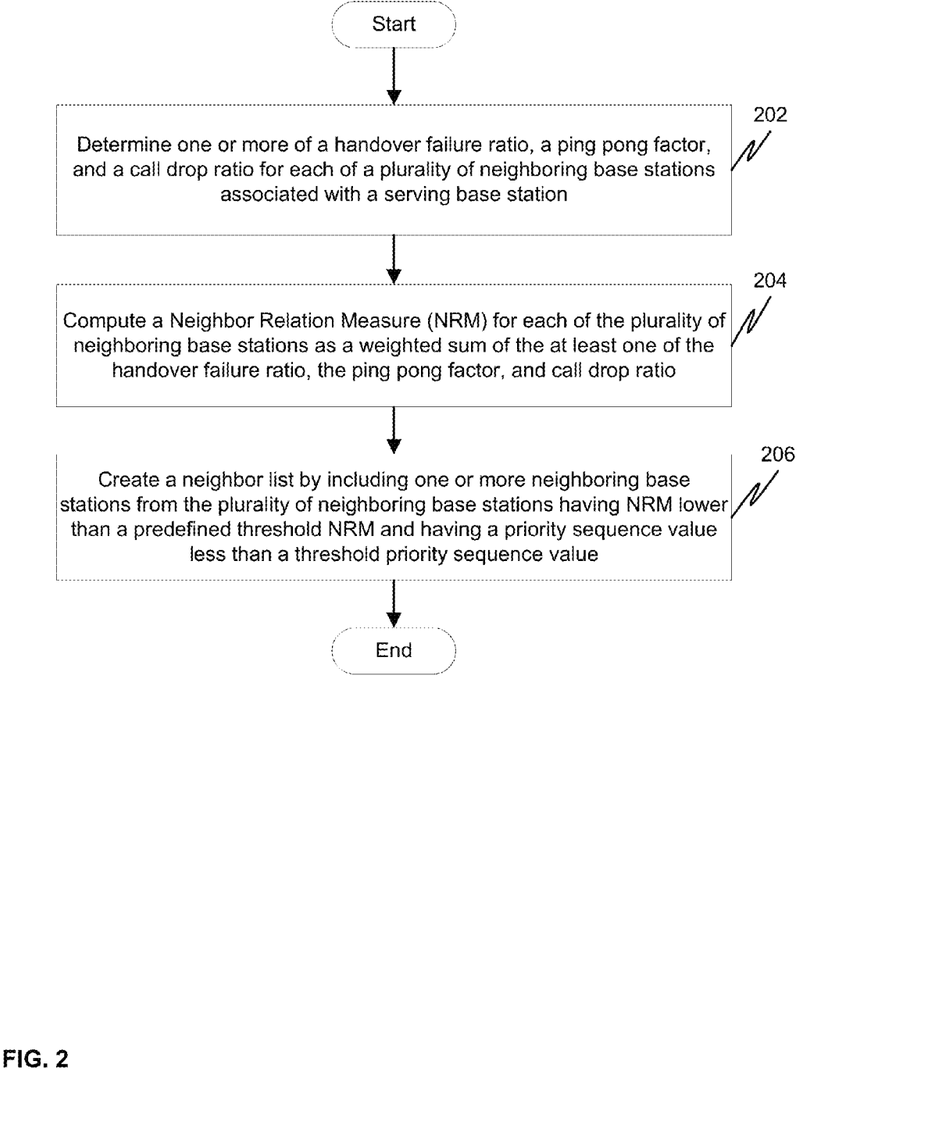
FIG. 2 is a flow diagram illustrating a method of automatically creating a neighbor list in accordance with some embodiments of the present disclosure.

Additional illustrative embodiments are listed below. FIG. 2 illustrates a flow diagram of a method of automatically creating a Neighbor Relation Table (NRT) or a neighbor list associated with a serving base station or eNB. The method may initially include determining at least one of a handover failure ratio, a ping pong factor, and a call drop ratio for each of a plurality of neighboring base stations associated with the serving base station at step 202. The neighboring base stations may be determined from a default NRT maintained by the serving base station. Here, the handover failure ratio associated with a neighbor base station may represent a number of failed handovers to a number of handover attempts made from the serving base station to the neighbor base station. Similarly, a call drop ratio associated with a neighbor base station may correspond to a ratio of call drops to a number of call connection attempts between one or more mobile stations or User Equipment (UE) and the neighbor base station. The ping pong factor associated with a neighboring base station may correspond to the number of times a call is handed back and forth between the serving base station and the neighboring base station in quick succession (time period between handovers is less than the critical time). The handover failure ratio, the ping pong factor, and the call drop ratio will hereinafter be collectively referred as neighbor base station parameters.

On determining the neighbor base station parameters for each neighbor in the default neighbor list, a Neighbor Relation Measure (NRM) may be computed for each of the neighboring base stations at step 204. The NRM for a base station may be computed as a weighted sum of the handover failure ratio, the ping pong factor, and the call drop ratio associated with that base station. The weights assigned to each of the neighbor base station parameters may be based on a current network traffic profile and may have a value ranging from 0 to 1. For example, the network traffic may be categorized as high traffic, medium traffic and low traffic based on different times of day. Exemplarily, the time window between 10 am and 12 am may be construed to have high network traffic and the time window between 12 am to 7 am may be construed to have low traffic. Accordingly, the weight assigned to the neighbor base station parameters may vary from 0 to 1 depending on the time of day. If W1(t) is the weight associated with the handover failure parameter for a particular time of day, W2(t) is the weight associated with the call drop parameter for the particular time of day, and W3(t) is the weight associated with the ping pong parameter for the particular time of day, then:

$$NRM_i = W1(T)*\%HOF + W2(t)*\%CD + W3(t)*\%PP$$

where represents the NRM of an ith neighbor base station and and are the handover failure ratio, the call drop ratio, and the ping pong factor respectively.

Once the NRM is computed for each of the neighboring base stations in the default neighbor list, one or more optimized neighbors may be determined. A neighbor list comprising the optimized neighbors may be created by including one or more of the neighboring base stations that have an NRM lower than a predefined threshold and having a priority sequence value less than a threshold priority sequence value at step 206. The priority sequence may comprise a sequence of neighbor base station parameters that assume priority based on different times of day. For example, during high network traffic times, the call drop ratio may be considered to have less priority than either the ping pong factor or the handover failure ratio when determining an optimal neighbor. In this case, due to the high call traffic, a few call drops may be considered acceptable as long as the majority of calls are not interrupted due to handover failure or ping pong effect. Here, in addition to a neighboring base station's NRM being lower than a threshold NRM, if the values of the ping pong factor and values of the handover failure ratio are below a predefined threshold for the ping pong factor and the handover failure respectively, then the neighboring base station may be included in the neighbor list.

In some embodiments, on determining the optimal neighbor base stations, weights assigned to the neighbor base station parameters for a traffic profile may be automatically tuned or modified based on values of the neighbor base station parameters averaged across all the neighboring base stations. For example, between two iterations of determining the optimal neighbors to include in a neighbor list, if the average value of the handover failure ratio has increased for a particular traffic profile, then the weight associated with the handover failure ratio for the particular traffic profile may be increased. Optimizing the weights at each iteration based on the actual neighbor base station parameters enables a more accurate computation of the NRM for each neighbor base station.

Figure 3:
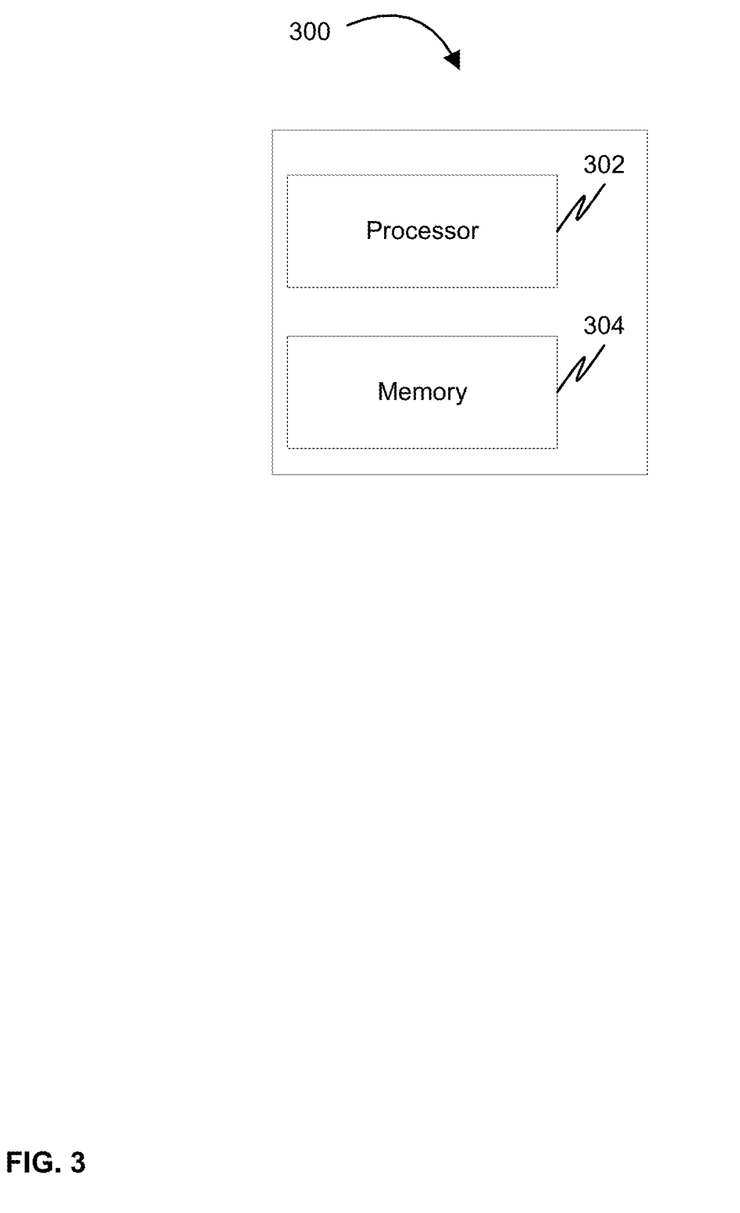
FIG. 3 is a block diagram illustrating a system for automatically creating a neighbor list in accordance with some embodiments of the present disclosure.

FIG. 3 illustrates a block diagram of an apparatus 300 for creating a neighbor list in accordance with some embodiments of the present disclosure. Apparatus 300 may be associated with a serving base station and may include a processor 302 and a memory 304 disposed in communication with processor 302 and storing processor-executable instructions. The instructions may include instructions to determine at least one of a handover failure ratio, a ping pong factor, and a call drop ratio for each of a plurality of neighboring base stations associated with the serving base station. The neighboring base stations may be determined from a default neighbor relation table maintained by the serving base station. The handover failure ratio for a neighbor base station may represent a number of failed handovers to a number of handover attempts made from the serving base station to the neighbor base station. Similarly, a call drop ratio associated with a neighbor base station may correspond to a ratio of call drops to a number of call connection attempts between one or more mobile stations or User Equipment (UE) and the neighbor base station. The ping pong factor may represent the number of times a call is handed back and forth between the serving base station and the neighboring base station in quick succession (time period between handovers is less than the critical time).

On determining the neighbor base station parameters for each neighbor in the default neighbor list, processor 302 may compute a Neighbor Relation Measure (NRM) for each of the neighboring base stations. The NRM for a base station may be computed as a weighted sum of the handover failure ratio, the ping pong factor, and the call drop ratio associated with that base station as explained in conjunction with FIG. 2. Once the NRM is computed for each of the neighboring base stations, processor 302 may identify one or more optimal neighbor base stations to include in the neighbor list. Neighboring base stations that have an NRM lower than a predefined threshold and having a priority sequence value less than a threshold priority sequence value may be identified as optimal neighbors as explained in conjunction with FIG. 2.

In some embodiments, on determining the optimal neighbor base stations, processor 302 may automatically modify the weights assigned to the neighbor base station parameters for a traffic profile based on values of the neighbor base station parameters averaged across all the neighboring base stations. Optimizing the weights at each iteration based on the actual neighbor base station parameters enables a more accurate computation of the NRM for each neighbor base station.

Computer System

Figure 4:
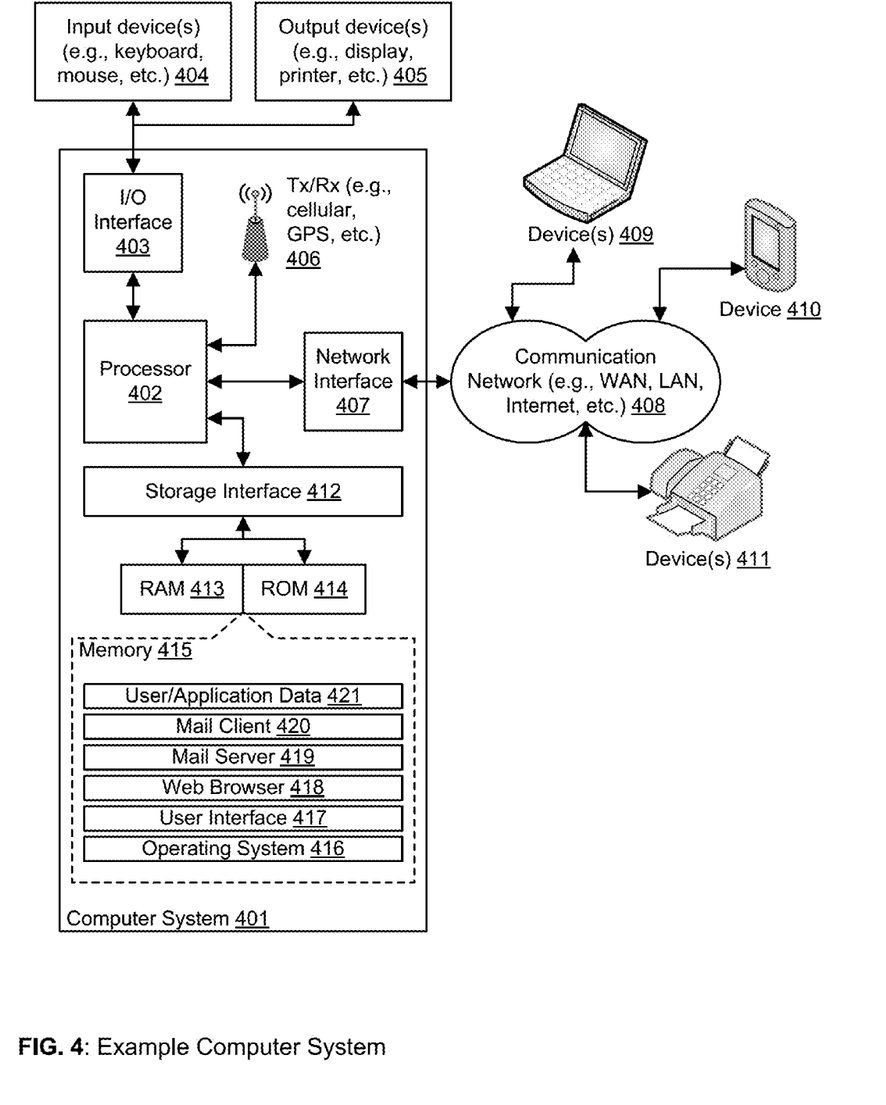
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing apparatus 300 for automatically creating a neighbor list. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method of automatically creating a neighbor list associated with a serving eNB. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of creating a neighbor list associated with a serving base station, the method comprising:

determining, by a base station management computing device, a handover failure ratio, a ping pong factor, and a call drop ratio for each of a plurality of neighboring base stations associated with the serving base station;

computing, by the base station management computing device, a Neighbor Relation Measure (NRM) for each of the plurality of neighboring base stations as a weighted sum of the handover failure ratio, the ping pong factor, and the call drop ratio associated with each of the plurality of neighboring base stations; and creating, by the base station management computing device, a neighbor list by including one or more neighboring base stations from the plurality of neighboring base stations having NRM lower than a predefined threshold NRM and having a priority sequence value less than a threshold priority sequence value, wherein the priority sequence value comprises a priority associated with at least one of the handover failure ratio, the ping pong factor, and the call drop ratio during a predefined time period.

2. The method of claim 1, wherein the handover failure ratio of a neighboring base station is a ratio of a number of failed handovers to a number of handover attempts made from the serving base station to the neighboring base station.

3. The method of claim 1, wherein the ping pong factor of a neighboring base station is a number of times a call is handed over from the serving base station to the neighboring base station and back from the neighboring base station to the serving base station in less than a predefined critical time.

4. The method of claim 1, wherein the call drop ratio is a ratio of a number of call drops to a number of call connection attempts.

5. The method of claim 1, wherein a weight associated with each of the at least one of the handover failure ratio, the ping pong factor, and call drop ratio is based on a network traffic profile.

6. The method of claim 1 further comprising modifying, by the base station management computing device, a weight associated with the handover failure ratio, the ping pong factor, and the call drop ratio based on an average value of the handover failure ratio, an average value of the ping pong factor, and an average value of the call drop ratio across the neighboring base stations associated with the neighbor list.

7. A base station management computing device comprising a processor and a memory coupled to the processor which is configured to be capable of executing programmed instructions comprising and stored in the memory to:

determine a handover failure ratio, a ping pong factor, and a call drop ratio for each of a plurality of neighboring base stations associated with a serving base station;

compute a Neighbor Relation Measure (NRM) for each of the plurality of neighboring base stations as a weighted sum of the handover failure ratio, the ping pong factor, and the call drop ratio associated with each of the plurality of neighboring base stations; and create a neighbor list by including one or more neighboring base stations from the plurality of neighboring base stations having NRM lower than a predefined threshold NRM and having a priority sequence value less than a threshold priority sequence value, wherein the priority sequence value comprises a priority associated with at least one of the handover failure ratio, the ping pong factor, and the call drop ratio during a predefined time period.

8. The device of claim 7, wherein the handover failure ratio is a ratio of a number of failed handovers to a number of handover attempts.

9. The device of claim 7, wherein the ping pong factor of a neighboring base station is a number of times a call is handed over from the serving base station to the neighboring base station and back from the neighboring base station to the serving base station in less than a predefined critical time.

10. The device of claim 7, wherein the call drop ratio is a ratio of a number of call drops to a number of call connection attempts.

11. The device of claim 7, wherein a weight associated with each of the at least one of the handover failure ratio, the ping pong factor, and call drop ratio is based on a network traffic profile.

12. The device of claim 7, wherein the processor coupled to the memory is further configured to be capable of executing at least one additional programmed instruction comprising and stored in the memory to modify a weight associated with the handover failure ratio, the ping pong factor, and the call drop ratio based on an average value of the handover failure ratio, an average value of the ping pong factor, and an average value of the call drop ratio across the neighboring base stations associated with the neighbor list.

13. A non-transitory computer readable medium having stored thereon instructions for creating a neighbor list associated with a serving base station comprising executable code which when executed by a process causes the processor to perform steps comprising:

determining a handover failure ratio, a ping pong factor, and a call drop ratio for each of a plurality of neighboring base stations associated with the serving base station;

computing a Neighbor Relation Measure (NRM) for each of the plurality of neighboring base stations as a weighted sum of the handover failure ratio, the ping pong factor, and the call drop ratio associated with each of the plurality of neighboring base stations; and creating a neighbor list by including one or more neighboring base stations from the plurality of neighboring base stations having NRM lower than a predefined threshold NRM and having a priority sequence value less than a threshold priority sequence value, wherein the priority sequence value comprises apriority associated with at least one of the handover failure ratio, the ping pong factor, and the call drop ratio during a predefined time period.

14. The medium of claim 13, wherein the handover failure ratio is a ratio of a number of failed handovers to a number of handover attempts.

15. The medium of claim 13, wherein the ping pong factor of a neighboring base station is a number of times a call is handed over from the serving base station to the neighboring base station and back from the neighboring base station to the serving base station in less than a predefined critical time.

16. The medium of claim 13, wherein the call drop ratio is a ratio of a number of call drops to a number of call connection attempts.

17. The medium of claim 13, wherein a weight associated with each of the at least one of the handover failure ratio, the ping pong factor, and call drop ratio is based on a network traffic profile.

18. The medium of claim 13 further having stored thereon at least one additional instruction that when executed by the processor causes the processor to perform at least one additional step comprising modifying a weight associated with the handover failure ratio, the ping pong factor, and the call drop ratio based on an average value of the handover failure ratio, an average value of the ping pong factor, and an average value of the call drop ratio across the neighboring base stations associated with the neighbor list.

* * * * *